United States Patent [19]

Altmeppen et al.

[11] Patent Number: 4,971,403
[45] Date of Patent: Nov. 20, 1990

[54] POWER BRAKE FOR AN ANTI-LOCK HYDRAULIC BRAKE SYSTEM

[75] Inventors: Johann Altmeppen, Barsinghausen; Hermann Hölscher, Hanover, both of Fed. Rep. of Germany

[73] Assignee: WABCO Westinghouse Fahrzeugbremsen GmbH, Hanover, Fed. Rep. of Germany

[21] Appl. No.: 391,051

[22] Filed: Aug. 8, 1989

[30] Foreign Application Priority Data

Aug. 20, 1988 [DE] Fed. Rep. of Germany ....... 3828377

[51] Int. Cl.$^5$ ................... B60T 15/36; B60T 13/68; B60T 13/70
[52] U.S. Cl. ..................... 303/115; 303/113
[58] Field of Search ............... 303/113, 115, 116, 119

[56] References Cited

U.S. PATENT DOCUMENTS 4,362,339 12/1982 Belart ..................... 303/113 X
4,655,509 4/1987 Ando et al. ................ 303/115 X
4,660,899 4/1987 Ando et al. ................ 303/115

FOREIGN PATENT DOCUMENTS 2450874 4/1980 Fed. Rep. of Germany .

OTHER PUBLICATIONS

H. Leffler, Universitätsbibliothek Hannover und TIB, pp. 2.263-2.271, 1986.
H. Leffler, Automobil-Revue, pp. 47-53, 1988.

Primary Examiner—Robert P. Olszewski
Assistant Examiner—A. Muratori
Attorney, Agent, or Firm—Horst M. Kasper

[57] ABSTRACT

This invention provides a servo cylinder and a power brake for an anti-lock hydraulic brake system. It enables elimination of a cutoff valve in the static circuit for anti-locking operation and at least compensates for a brake pressure component produced in the servo cylinder by the static control pressure by providing an oppositely directed dynamic control pressure independent of the anti-locking system.

70 Claims, 6 Drawing Sheets

POWER BRAKE FOR AN ANTI-LOCK HYDRAULIC BRAKE SYSTEM

FIELD OF THE INVENTION

The present invention relates, in general, to a hydraulic brake system equipped with an anti-lock system and, more particularly, this invention relates to both a servo cylinder and a power brake unit for use in an anti-lock hydraulic brake system having a master cylinder, a servo valve apparatus, and at least one servo cylinder.

BACKGROUND OF THE INVENTION

In the motor vehicle industry, it is conventional in an anti-lock hydraulic brake system to designate the master cylinder and the various equipment components which are either connected directly to or connectable with it as the "static circuit". Likewise, it is conventional to designate the booster valve equipment as well as the various equipment components which are either connected directly to or connectable with it as the "dynamic circuit".

Prior to the present invention, an anti-lock hydraulic brake system equipped with a power brake unit has been described in the prior art. See, for example, German publication No. DE 24 50 874 B2. This prior art reference teaches a master cylinder and the booster valve apparatus being combined into a single operating component. In this above-referenced publication, the servo cylinder provided is divided into a servo apparatus and a delivery cylinder. In this arrangement, therefore, the piston unit associated with the servo cylinder thereby comprises a piston of the servo apparatus and a piston of the delivery cylinder. The brake pressure required for operational movement of the wheel brake cylinder is produced in the brake chamber of the servo cylinder. This brake pressure consists of a first portion being produced by the static control pressure and a second portion being produced by the dynamic control pressure. The static control pressure is generated by means of a first control surface. This first control surface is the left surface of the piston associated with the delivery cylinder portion of the servo cylinder. The dynamic control pressure is generated by means of a second control surface. This second control surface is the left surface of the piston associated with the servo apparatus portion of the servo cylinder. In this prior art power brake, under normal operating conditions, the volume of the first control chamber of the servo cylinder which is delimited by such first control surface will increase with an increasing application force being exerted on the master cylinder. Such normal operating conditions, referred to above, exist when the anti-lock system (hereinafter referred to as ABS) is not engaged. The resulting stroke of the mechanism for making a brake application, which is normally a brake pedal, will transmit to an operator of the vehicle some feedback from the brake system, and thus the accustomed feel of the brake operation.

In the power brake disclosed in the above referenced German publication No. DE 24 50 874 B2, the ABS only acts on the dynamic control pressure by means of a corresponding electrically activated valve apparatus, which are designated 17 and 17a in such reference. Therefore, without additional measures being taken, only that portion of the brake pressure produced by this dynamic control pressure could be regulated during an operation of the ABS. Therefore, in this prior art arrangement, that portion of the brake pressure produced by the static control pressure would represent the lower limit capability of the control range of such ABS. This represents a considerable disadvantage of such ABS. In order to eliminate this particular disadvantage, such ABS includes a cutoff valve, designated as 19, in the connection located between the output of the master cylinder and the first control chamber of the servo cylinder. Such cutoff valve is set in the cutoff position at the beginning of an operation of such ABS. In this manner, the first control chamber is separated from the master cylinder and is connected to the auxiliary reservoir provided in such hydraulic brake system. The restriction of the lower limit capability of the control range on such ABS is thereby eliminated. However, as a result of this above-mentioned connection of the first control chamber to such auxiliary reservoir, the static control circuit is in an open condition. This open condition of the static control circuit represents what is considered in the art to be a rather severe disadvantage with respect to safety.

That portion of the brake pressure produced by the static control pressure in the prior art ABS, as described in such German publication No. DE 24 50 874 B2, disappears suddenly as a result of the activation of the cutoff valve at the beginning of an anti-lock operation. Further, such brake pressure produced by the static control pressure is restored suddenly upon return to normal operation. Additionally, this cutoff valve is one more source for a potential malfunction of such prior art ABS.

SUMMARY OF THE INVENTION

The present invention provides both a servo cylinder and a power brake arrangement for an anti-lock hydraulic brake system. This anti-lock hydraulic brake system includes a master cylinder, a servo valve apparatus, and at least one servo cylinder manufactured according to the present invention. In this power brake arrangement, the master cylinder will deliver a static control pressure at its outlet. Such static control pressure is a function of the application force being applied to the master cylinder. The servo valve apparatus includes an inlet port and an outlet port. Such inlet port is connected with a fluid pressure source which delivers a supply of fluid pressure thereto. The servo valve apparatus can be controlled by the static control pressure. In addition, such servo valve apparatus delivers from the fluid pressure source a dynamic control pressure at its outlet port. Up to the level of such supply pressure, this dynamic control pressure is a fixed transmission ratio for the static control pressure. The servo cylinder of the anti-lock hydraulic brake system includes a piston unit. Such piston unit, on the one hand, has a first control surface delimiting a first control chamber and a second control surface delimiting a second control chamber. On the other hand, the piston unit includes a reaction surface delimiting a brake chamber. Such brake chamber is connected with at least some of the wheel brake cylinders forming a portion of the anti-lock hydraulic brake system. The second control chamber of the servo cylinder can be connected with the outlet port of the servo valve apparatus. This connection is achieved by means of an electrically activated valve apparatus. Such electrically activated valve apparatus corresponds to an anti-lock portion of the hydraulic brake system. The first control chamber of the servo cylinder is connected to an outlet port of the master cylinder. The connection of such first control chamber to such master cylinder is a direct connection. The piston unit of the servo cylinder also includes an equalization surface delimiting an equalization chamber. Such equalization surface of the piston unit is located intermediate the first control surface and the second control surface of such piston unit. The equalization chamber is connected with the outlet port of the servo valve apparatus. The area of the equalization surface is in the ratio to the area of the first control surface, at least as the reciprocal of the transmission ratio of the dynamic control pressure to the static control pressure.

OBJECTS OF THE INVENTION

It is, therefore, one of the primary objects of the present invention to provide a power brake for an anti-lock hydraulic brake system which, through the use of rather simple means, with a "closed" static control circuit, i.e., with a static control circuit in which, at least during the change between ABS operation and normal operation on the occasion of the application of the brakes, there is no connection required between a first control chamber and the auxiliary reservoir.

Another object of the present invention is to provide a power brake for an anti-lock hydraulic brake system in which the cutoff valve required in the prior art brake systems can be eliminated, thereby eliminating at least one source of a potential operating malfunction.

Still another object of the present invention is to provide a power brake for an anti-lock hydraulic brake system which is significantly more economical to manufacture.

An additional object of the present invention is to provide a power brake for an anti-lock hydraulic brake system which substantially eliminates an ABS sudden brake pressure change and thereby substantially ensures a steady braking action of such anti-lock hydraulic brake system.

In addition to the various objects and advantages of the power brake for an anti-lock hydraulic brake system which have been described above, various other objects and advantages of the present invention will become more readily apparent to those persons who are skilled in the vehicle braking art from the following more detailed description of such invention, particularly when such description is taken in conjunction with the attached drawing Figures and with the appended claims.

BRIEF DESCRIPTION OF THE INVENTION

Figure 1:
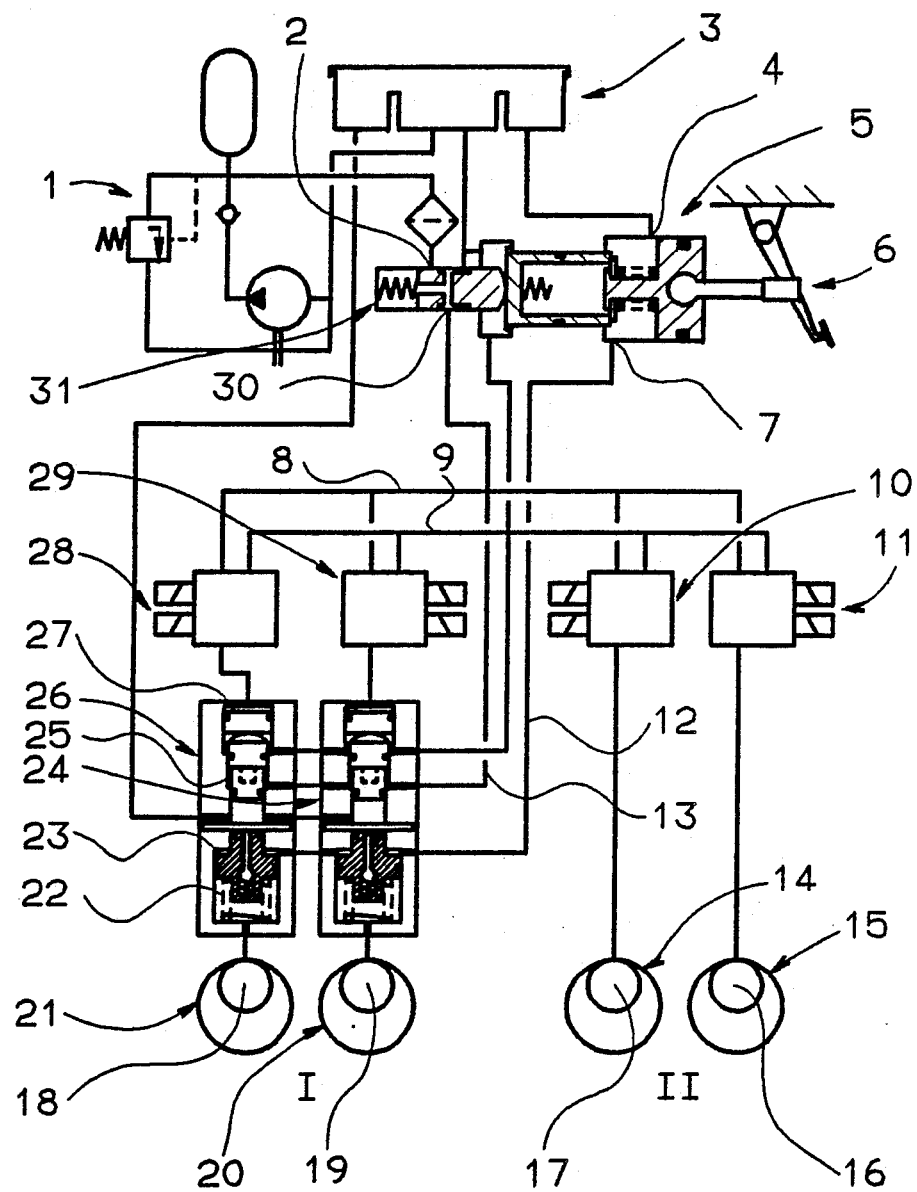
FIG. 1 is a schematic illustration of a power brake for an anti-lock hydraulic brake system constructed according to one presently preferred embodiment of the invention.

Prior to proceeding to the more detailed description of both the servo cylinder and the power brake for an anti-lock hydraulic brake system, it should be noted that throughout the several views illustrated in the attached drawings, identical components having identical functions have been identified with identical reference numerals.

It should also be noted that in the several views of the drawings solid lines have been used for the hydraulic fluid connections and dotted lines have been used for the electrical connections.

Now refer more particularly to FIG. 1. Illustrated in FIG. 1 is a power brake unit 5, 24, 26 and 31. Such power brake unit consists of a master cylinder, generally designated 5, a servo valve apparatus, generally designated 31, and a pair of servo cylinders, generally designated 24 and 26. As illustrated, the master cylinder 5 and the servo valve apparatus 31 are combined into a single component. However, it should be understood that it is within the scope of the present invention for such master cylinder 5 and such servo valve apparatus 31 to be designed as separate operating components which can perform the required functions. These required functions of such master cylinder 5 and such servo valve apparatus 31 will be described in considerably greater detail hereinafter.

The power brake unit 5, 24, 26 and 31 is part of an anti-lock hydraulic brake system. The anti-lock hydraulic brake system, according to a presently preferred embodiment of the invention, includes a brake application mechanism, hereinafter assumed to be a brake pedal, generally designated 6, a pressure source, generally designated 1, an auxiliary reservoir, generally designated 3, wheel brakes, generally designated 14, 15, 20 and 21, having associated therewith wheel brake cylinders 17, 16, 19 and 18, respectively, an anti-lock system, hereinafter referred to as ABS, in addition to such power brake unit 5, 24, 26 and 31. In FIG. 1, only the electrically activated valves, generally designated 10, 11, 28 and 29, hereinafter referred to as ABS valve(s), and the corresponding hydraulic and electrical connections of the ABS have been illustrated.

The pressure source 1, in substantially the same manner as the prior art, for which reason it will not be described in any further significant detail, comprises a compressor, a reservoir, and a pressure control apparatus. However, it should be noted that the provision of the reservoir is not essential in the present invention. The pressure control unit is provided to regulate the pressure from the pressure source 1 to the supply pressure required by the anti-lock hydraulic brake system. Such regulation of the pressure may be accomplished, for example, through the use of a governor.

In the presently preferred embodiment of the invention, the master cylinder 5 portion of the power brake 5, 24, 26 and 31 is connected by way of an inlet port 4 with the auxiliary reservoir 3. Such master cylinder 5 is constructed substantially in the manner of known prior art master cylinders. Consequently, when the anti-lock hydraulic brake system is activated by pressure being exerted on the brake pedal 6, it releases a static control pressure at an outlet port 7. The static control pressure released at the outlet port 7 of the master cylinder 5 is a function of the application force being exerted by an operator of the vehicle on the brake pedal 6. The servo valve apparatus 31 portion of such anti-lock hydraulic brake system has an inlet port 2 connected with the pressure source 1 and an outlet port 30. The servo valve apparatus 31 is also constructed in substantially the same manner as the servo valve taught in the prior art. Such servo valve apparatus 31 can be controlled by means of the static control pressure. At the outlet port 30 of the servo valve apparatus 31 pressure from the pressure source 1 is released as a dynamic control pressure. Such dynamic control pressure is released until the level of the supply pressure is in a specified transmission ratio of the static control pressure. This, too, is accomplished in substantially the same manner as taught in the prior art by the ratio of the surface area of the pistons.

The wheel brakes 20 and 21 as well as the corresponding wheel brake cylinders 19 and 18, respectively, are positioned on a first vehicle axle, designated I in FIG. 1, and the wheel brakes 14 and 15 with their corresponding wheel brake cylinders 17 and 16 are positioned on another vehicle axle, designated II in FIG. 1. Each such wheel brake cylinder 16, 17, 18 and 19 has its own ABS valve 11, 10, 28 and 29, respectively. These ABS valves 10, 11, 28 and 29 are located in the anti-lock hydraulic brake system and are constructed in substantially the same manner as the prior art ABS valves. Consequently, as a function of the electrical activation, such ABS valves 10, 11, 28 and 29 connect the brake system components positioned downstream from them with the outlet port 30 of the servo valve apparatus 31 or with the auxiliary reservoir 3.

The wheel brake cylinders 14 and 15, located on the vehicle axle II, are not described in any further substantial detail below. Such wheel brake cylinders 14 and 15 can be connected via their corresponding ABS valve 10 and 11 directly with the outlet port 30 of the servo valve apparatus 31. In this arrangement, such wheel brake cylinders 14 and 15 with their associated ABS valves 10 and 11 are a part of the dynamic control circuit exclusively. On the other hand, the servo cylinders 24 and 26 are located on the vehicle axle I between the wheel brake cylinders 18 and 19 and their corresponding ABS valve 29 and 28. In the arrangement of the present invention, illustrated in FIG. 1, such vehicle axle I is the front axle of the vehicle.

The two servo cylinders 24 and 26 are identical to one another. Therefore, the description of the servo cylinder 26 which follows will apply equally to each of the servo cylinders 24 and 26.

Figure 2:
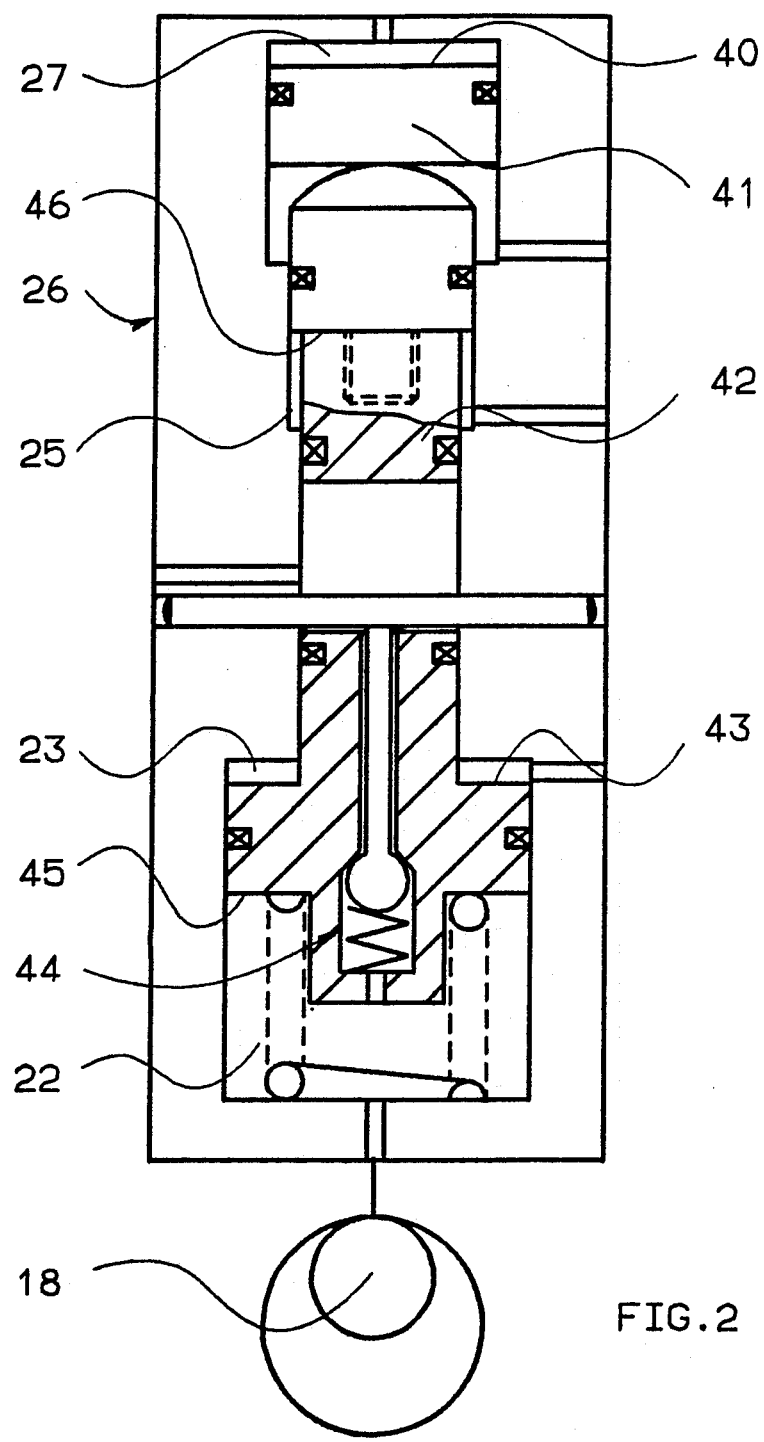
FIG. 2 is an enlarged view, partially in cross-section, of one presently preferred servo cylinder constructed according to the present invention utilized in the power brake for an anti-lock hydraulic brake system illustrated in FIG. 1.

Reference is now made to FIG. 2 in which there is illustrated one presently preferred servo cylinder, generally designated 26. This servo cylinder 26 includes a first control chamber 23, a second control chamber 27, a brake chamber 22, and an equalization chamber 25. The first control chamber 23 is connected by way of a hydraulic fluid communication line or connection 12 (FIG. with the outlet port 7 of the master cylinder 5. The second control chamber 27 can be connected by means of the corresponding ABS valve 28 (FIG. and the hydraulic fluid communication lines or connections 8 and 9 with the outlet port 30 of the servo valve apparatus 31 (FIG. 1) or with the auxiliary reservoir 3 (FIG. 1). In this manner, such second control chamber 27 represents at least a portion of the equipment located downstream of such ABS valve 28. The brake chamber 22 is connected to the corresponding wheel brake cylinder 18 (FIG. 1), while the equalization chamber 25 is connected by means of a hydraulic fluid communication line or connection 13 (FIG. 1) with the outlet port 30 of the servo valve apparatus 31 (FIG. 1).

In a manner which will not be described in any substantially greater detail, such servo cylinder 26 includes leak chambers located, as necessary, between the above-mentioned chambers. Such leak chambers are connected, as is readily apparent from the corresponding hydraulic connections, to the auxiliary reservoir 3 (FIG. 1).

As shown in detail in FIG. 2, the servo cylinder 26 includes a piston unit 41 and 42. Such piston unit 41 and 42 is guided within the servo cylinder 26 so that it moves in a sealed manner. On one hand, the piston unit 41 and 42 delimits the first control chamber 23 and the second control chamber 27 with a first control surface 43 and a second control surface 40. On the other hand, the piston unit 41 and 42, in the opposite direction of force, delimits the brake chamber 22 with a reaction surface 45 and the equalization chamber 25 with an equalization surface 46. In the presently preferred embodiment of the invention, the piston unit 41 and 42 is graduated. In this manner, the first control surface 43 and the equalization surface 46 will exhibit graduated or annular surfaces, and the second control surface 40 and the reaction surface 45 form the outside end surfaces. It should be understood, however, that other suitable surface configurations are also possible and are considered to be within the scope of the present invention unless otherwise claimed.

Further illustrated in FIG. 2 is an auxiliary valve 44 positioned within the piston unit 41 and 42. This auxiliary valve 44, in conjunction with a return spring (not shown) on the piston unit 41 and 42, connects the brake chamber 22 and thus the wheel brake cylinder 18 to the auxiliary reservoir 3 by way of the corresponding hydraulic fluid communication line or connection, shown in FIG. 1, when the anti-lock hydraulic brake system is in an inactive state.

For the purpose of the following functional operating description of the power brake for an ABS hydraulic brake system, according to the present invention, it should first be assumed that the size or area of the equalization surface 46 is in substantially the same ratio to the size or area of the first control surface 43 as the reciprocal of the transmission ratio of the dynamic control pressure to the static control pressure.

Therefore, during normal operation of such anti-lock hydraulic brake system by means of pressure being exerted on the brake pedal 6, in one direction of force, with an intact brake system, this means that the first control surface 43 will be pressurized with the static control pressure and the second control surface 40 will be pressurized with the dynamic control pressure. In view of the fact that the equalization surface 46 will be pressurized substantially simultaneously in the opposite direction of force with the dynamic control pressure, the force being exerted by the static control pressure on the piston unit 41 and 42 will be essentially equalized. The dynamic control pressure acting on the second control surface 40 produces a brake pressure in the brake chamber 22 of the servo cylinder 26, and thus in the wheel brake cylinder 18. Such brake pressure, by means of the reaction surface 45, brings the piston unit 41 and 42 into equilibrium against the dynamic control pressure. Because of the elasticity normally present in each of the wheel brake 21, the wheel brake cylinder 18, and the hydraulic fluid communication line leading to such wheel brake cylinder 18, the piston unit 41 and 42 is caused to move in a direction toward the brake chamber 22 when the brake system is activated. As a consequence of the resulting enlargement of the first control chamber 23, the piston in the master cylinder 5 and thus the brake pedal 6 will execute a stroke. In this manner, the desirable feedback of the anti-lock hydraulic brake system which was part of the prior art system is retained in the present invention. The same is true in the case of an increase in the application force during a brake application.

If an operation of the ABS now begins, the equalization achieved between the piston unit 41 and 42 and the static control pressure will remain unaffected. The static control pressure present in the first control chamber 23 is therefore maintained. As a consequence, the static circuit remains "closed". The maintenance of the above-described equilibrium further means that the dynamic control pressure which acts on such second control surface 40 before operation of the ABS, and thus the braking pressure, can be reduced by means of the ABS valve 28 without the sudden ABS pressure change of the prior art anti-lock hydraulic brake systems. In the present invention, this reduction of the dynamic control pressure will occur precisely and smoothly to any desired value, including zero. In addition, the dynamic control pressure can be increased again, in a precise and smooth manner, to the starting value.

In view of the fact that in the power brake for an anti-lock hydraulic brake system, according to a presently preferred embodiment of the invention, the static control pressure does not participate in the production of the required brake pressure during a brake application, the correspondence of an application force and the braking pressure changes. This is in contrast with the prior art anti-lock brake system described above. It is generally recognized and understood that suitable measures are necessary to maintain the correspondence of an application force and braking pressure in the known prior art anti-lock brake system. For example, the prior art anti-lock brake system may require a tuning of the surfaces and/or chamber volumes in the servo cylinder and/or the master cylinder.

According to the present invention, in the case of a brake application occurring when the dynamic control circuit has failed, the piston 41 and 42 will not be equalized in relation to the static control pressure. This means that the static control pressure then produces a braking pressure which is below the static control pressure in the ratio of the first control surface 43 to the reaction surface 45. Nevertheless, an auxiliary braking action must be guaranteed by means of such static control pressure. In this case, however, an operation of the ABS is not possible until such dynamic control circuit has been made operational once again.

Again, in the case of a brake application occurring when the static control circuit has failed, the servo valve apparatus 31, in the present invention, is controlled directly by the application force. In this instance, the dynamic control circuit remains fully functional. However, the brake pressure which can now be achieved is reduced as a function of the ratio of the equalization surface 46 to the second control surface 40 of such servo cylinder 26. In this instance, the auxiliary braking action can be guaranteed. This is particularly the case because the wheel brakes 14 and 15 of the vehicle axle II will remain fully functional even though such static circuit has failed. In addition, the anti-lock hydraulic brake system will remain ABS-functional.

In the surface area ratio established between the equalization surface 46 and the first control surface 43, used as a basis for the above operating description, the equilibrium of the piston unit 41 and 42 in relation to the static control pressure will disappear when the servo valve apparatus 31 is activated (that is, when there is an equilibrium established between the dynamic control pressure and the supply pressure), and the application force is further increased. In this instance, an increase of the brake pressure is only produced by the non-equalized portion of the static control pressure. In other words, this brake pressure increase represents a portion of the brake pressure produced by the static control pressure. When an operation of the ABS is initiated, this portion serves as the lower limit of a control range for such ABS. This does represent somewhat of a disadvantage. However, this disadvantage can be reduced simply by increasing the ratio of the size of such equalization surface 46 to the size of the first control surface 43. Furthermore, this disadvantage can be completely eliminated by designing the equalization surface 46 and/or the first control surface 43 in a manner such that the size of such equalization surface 46 is in substantially the same ratio to the size of the second control surface 40 and as the maximum expected static control pressure (that is, the static control pressure at the maximum anticipated application force) to the supply pressure. It should be recognized and understood, by persons skilled in the hydraulic braking art, that such a measure to maintain this correspondence between an application force and a brake pressure makes certain other appropriate steps necessary. For example, these steps may include a tuning of the various surfaces and/or the chamber volumes in the servo cylinder 26 and/or the master cylinder 5 of the anti-lock hydraulic brake system.

It should be readily apparent that the action and interaction of the various equipment components and subcomponents described above will occur independently of the number of servo cylinders 26 employed in the invented anti-lock hydraulic brake system. For example, subject to various other requirements for the distribution of the brake system over the axles I and II, there can be one servo cylinder 26 for each wheel brake 14, 15, 20 and 21, or a common servo cylinder 26 for all of such wheel brakes 14, 15, 20 and 21, or one servo cylinder 26 for the wheel brakes 14, 15, 20 and 21 of each axle I or II and/or for both axles I and II.

Figure 3:
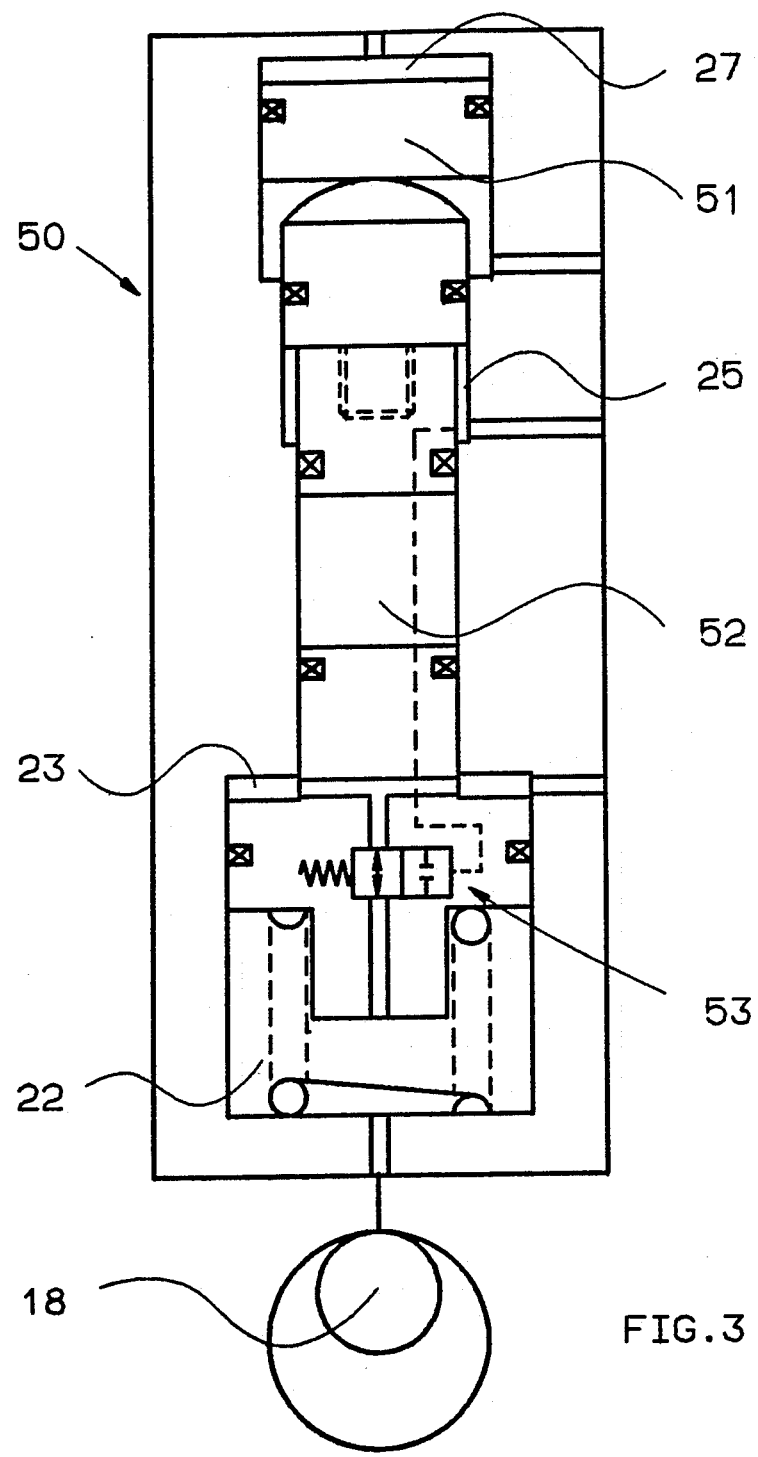
FIG. 3 illustrates an alternative embodiment of a servo cylinder which is equipped with an integrated cutoff apparatus for use in a power brake for an anti-lock hydraulic brake system of the present invention.

Now refer more particularly to FIG. 3. Illustrated therein is an alternative embodiment of a servo cylinder, generally designated 50, which differs from the servo cylinder 26 described above by having an integrated cutoff apparatus, generally designated 53, incorporated therein. Such cutoff apparatus 53 connects the first control chamber 23 and the brake chamber 22 when the anti-lock hydraulic brake system is not activated and/or in the event of a failure of the dynamic control pressure. In this embodiment of the invention, the cutoff apparatus 53 is integrated into the piston unit 51 and 52. Such cutoff apparatus 53 is positioned in a passage formed in the piston unit 51 and 52. This passage in the piston unit 51 and 52 is disposed intermediate the first control chamber 23 and the brake chamber 22. The passage containing the cutoff apparatus 53 is pressure-controlled and is connected by means of a system of apertures (indicated in FIG. 3 by dotted lines) on a control side thereof with the equalization chamber 35. In the presence of a dynamic control pressure in such servo cylinder 50, such cutoff apparatus 53 will cut off the fluid communication passage located between the first control chamber 23 and the brake chamber 22. On the other hand, in the absence of a dynamic control pressure, such cutoff apparatus 53 will open this fluid communication passage between such first control chamber 23 and the brake chamber 22. The absence of a dynamic control pressure in such servo cylinder 50 will at least occur, for example, when the anti-lock hydraulic brake system is in an inactive state or when the dynamic circuit fails. In this alternative configuration, the brake chamber 22 is supplied fluid from the auxiliary reservoir 3 (FIG. 1) by means of the master cylinder 5 (FIG. 1). In this manner, the separate fluid communication connection between the brake chamber 22 and such auxiliary reservoir 3 (FIG. 1) required in the previously described embodiment can be eliminated.

When compared to the previous embodiment, the alternative configuration illustrated in FIG. 3 offers the advantage of having the internal sudden transmission change. As a result of the open connection provided between the master cylinder 5 (FIG. 1) and the brake chamber 22 and thus the brake cylinder 18, when the dynamic circuit fails for some reason, the brake pressure is not reduced in the ratio of the first control surface 43 (FIG. 2) to the reaction surface 45 (FIG. 2), but the static control pressure is available in full to serve as the brake pressure.

With this increase of the brake pressure, the volume of hydraulic fluid required to be supplied by the master cylinder 5 (FIG. 1), and thus the stroke of the brake pedal 6, increases. In a rather rough approximation, it can be generally assumed that when the dynamic control circuit fails, the ratio of the stroke of such brake pedal 6 in relation to the stroke of such brake pedal 6 (FIG. 1) with an intact dynamic control circuit is the reciprocal of the ratio of the first control surface 43 (FIG. 2) to the reaction surface 45 (FIG. 2).

Figure 4:
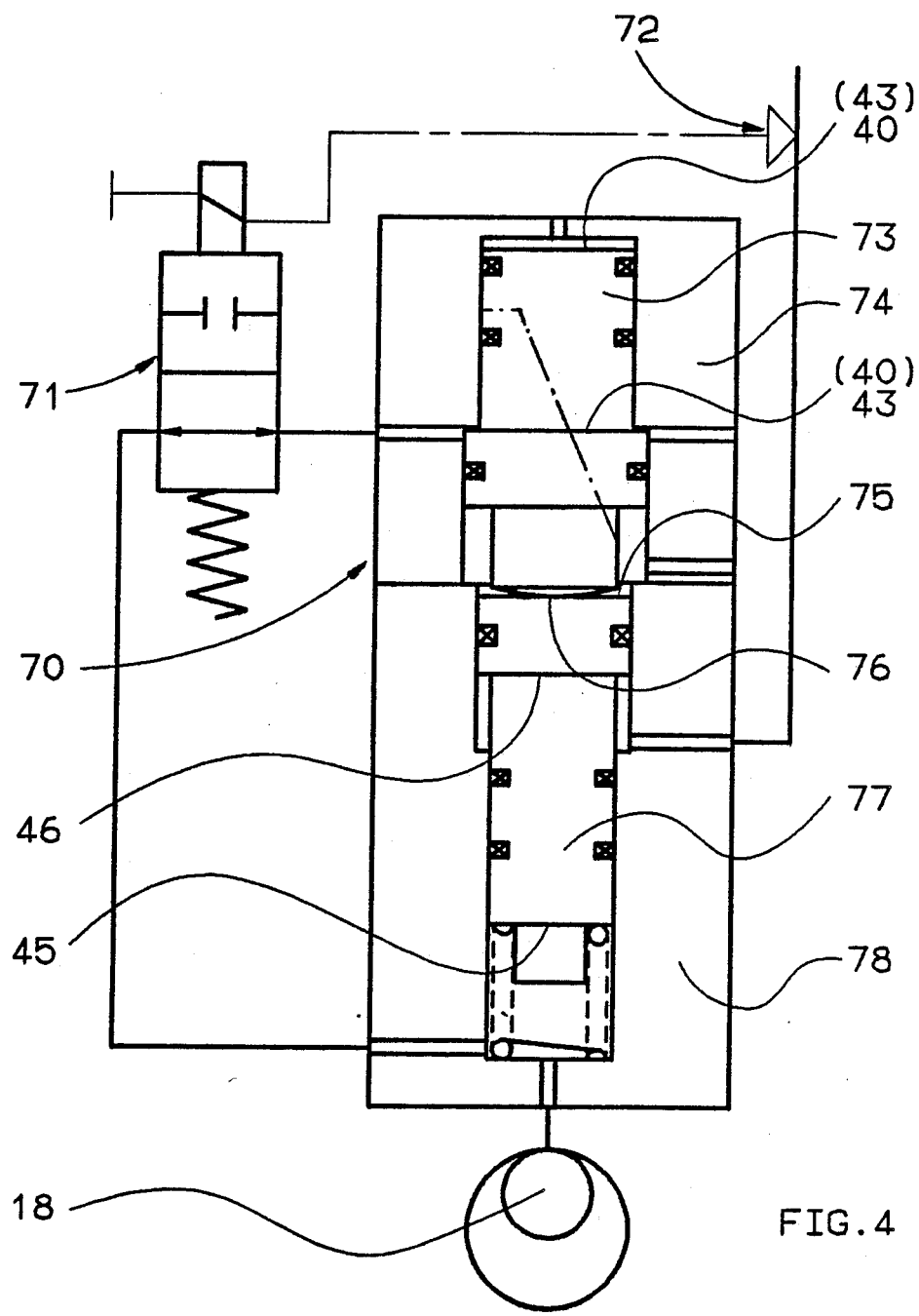
FIG. 4 illustrates one configuration of another alternative embodiment of a servo cylinder which is equipped with a piston unit consisting of two pistons.

Reference is now made to FIG. 4 in which there is illustrated still another alternative embodiment of a servo cylinder, generally designated 70. Such servo cylinder 70 includes a piston unit that consists of two pistons 73 and 77. Such pistons 73 and 77 are disposed in separate housing portions 74 and 78, respectively. The piston end surface 75 of the piston 73 and the piston end surface 76 of the piston 77 both face one another and are abuttingly engaged with one another. The first control surface 43 and the second control surface 40 are disposed on the piston 73, while the equalization surface 46 and the reaction surface 45 are disposed on the other piston 77. In FIG. 4, the first control surface 43 is illustrated as a graduated or annular surface, and the second control surface 40 is illustrated as the end surface of the piston 73. However, it should be readily apparent to persons skilled in the anti-lock hydraulic braking art that with appropriately sized components, the position of the first control surface 43 and the second control surface 40 can be exchanged. This has been indicated in FIG. 4 by the reference numerals enclosed in brackets.

This particular alternative configuration offers a practical solution for achieving a significant simplification of the fabrication of the servo cylinder 70 used in an anti-lock hydraulic brake system. In addition, this particular servo cylinder 70 will provide increased reliability in service on such anti-lock hydraulic brake system. Each of the pistons 73 and 77 as well as a respective housing portion 74 and 78, represent relatively simple components, from the fabrication technology point of view, and can, therefore, be fabricated relatively inexpensively. Furthermore, as a result of the simplification, the danger of a component jamming or otherwise seizing in the housing is substantially minimized. Contributing to this protection is a raised portion which has a spherical configuration adjacent the engaged end surface 76 of at least the piston 73. This spherical configuration of the end surface 76 provides a spot or small-surface-area contact. In addition, such spherical configuration of such end surface 76 avoids the transmission of transverse forces between the pistons 73 and 77.

Also illustrated in FIG. 4 is an electrically controlled cutoff apparatus, generally designated 71. Although this cutoff apparatus 71 is shown as an independent component, it should be understood that it is within the scope of the present invention to integrate such cutoff apparatus 71 into the servo cylinder 70, if desired. In a presently preferred arrangement of this embodiment, the cutoff apparatus 71 receives its electrical control signal from a pressure sensor, generally designated 72, for example. In this case, the pressure sensor 72 monitors the dynamic control pressure present in a fluid communication line. It is to be understood, however, that it is within the scope of the present invention for the electrical control signal to also be obtained in any other appropriate manner as is known in the art. In the case of the above-mentioned exchange of position of the first control surface 43 and the second control surface 40, the input of the cutoff apparatus 71 must likewise be changed in an appropriate manner.

Figure 5:
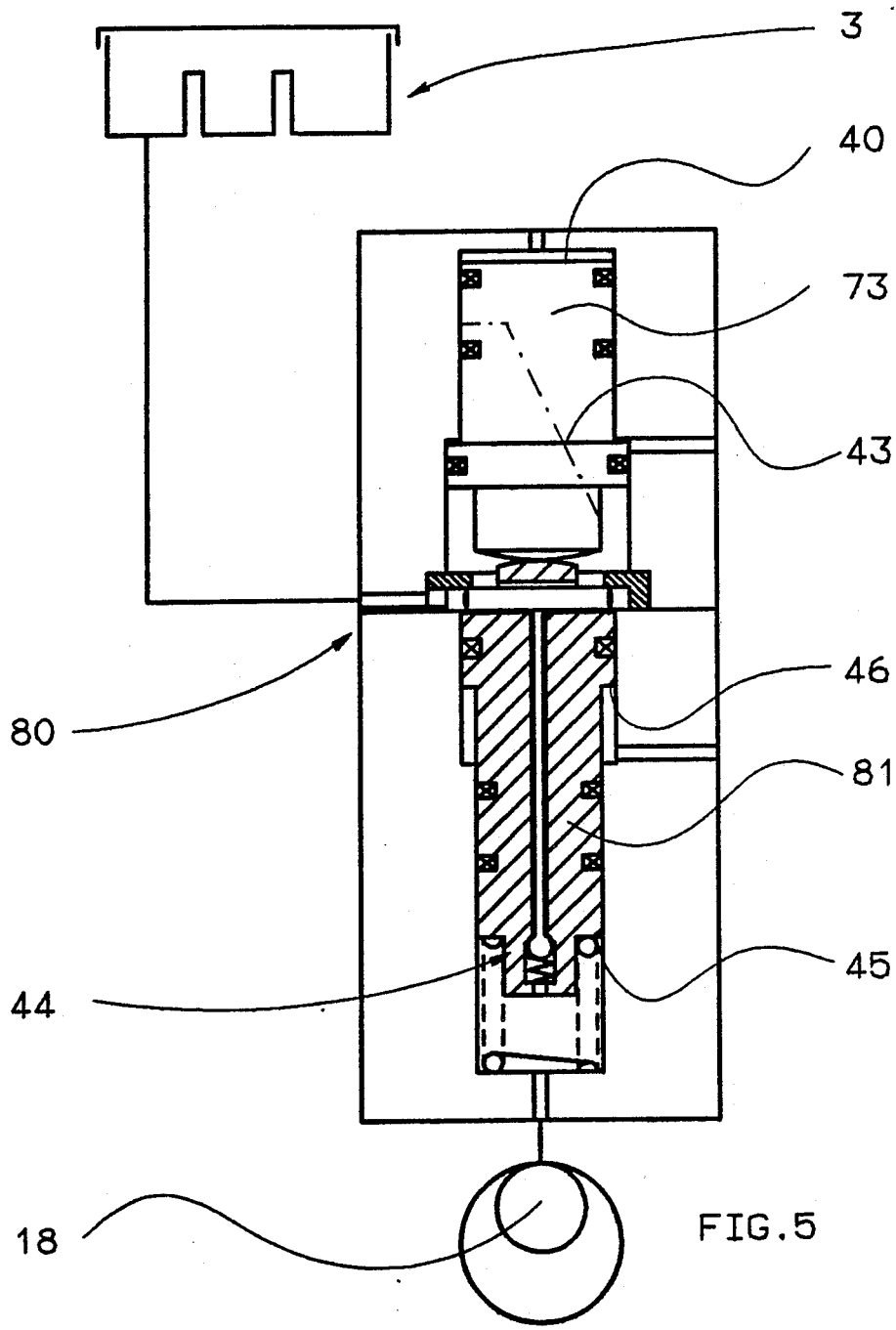
FIG. 5 illustrates an alternative configuration of a servo cylinder illustrated in FIG. 4.

Further reference is now made to FIG. 5, which illustrates yet another alternative embodiment of a servo cylinder, generally designated 80. The servo cylinder 80 is similar in many ways to the servo cylinder 70 discussed above and illustrated in FIG. 4. The essential difference between the servo cylinder 80 and the servo cylinder 70 is that the servo cylinder 80 includes an auxiliary valve, generally designated 44, which functions like such auxiliary valve 44 in the servo cylinder 26 illustrated in FIG. 2. Another difference is found in the piston unit 73 and 81. Piston 73 is identical to corresponding piston 73 in the embodiment illustrated in FIG. 4.

On the other hand, the piston 81 differs from the piston 77 illustrated in FIG. 4 only in terms of the changes necessitated to accommodate the auxiliary valve 44. It should be noted that in this embodiment of the present invention, the internal sudden transmission change cannot be achieved with servo cylinder 80.

Figure 6:
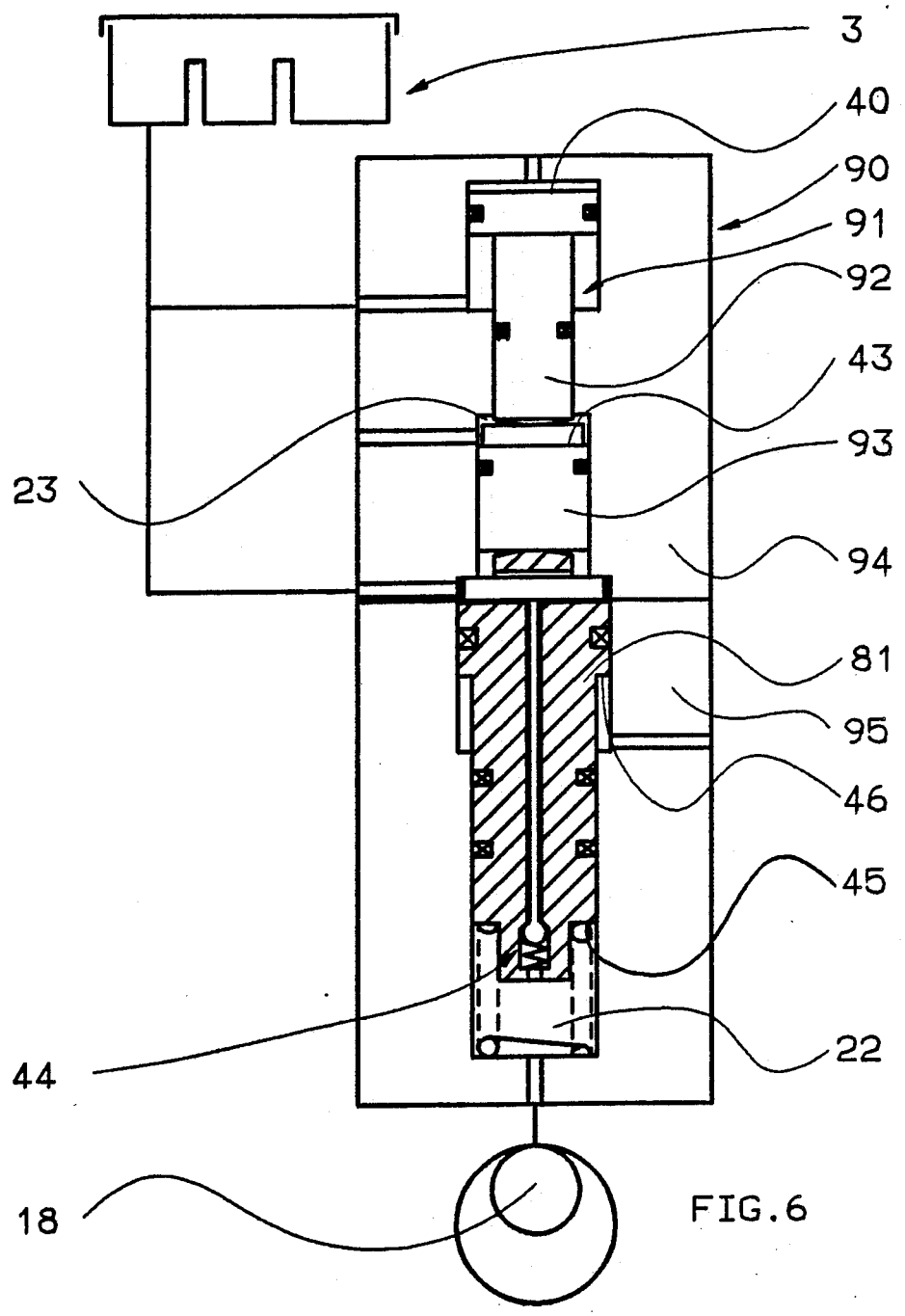
FIG. 6 illustrates yet another alternative configuration of a servo cylinder illustrated in FIGS. 4 and 5.

A final alternative embodiment of the present invention is illustrated in FIG. 6. In this embodiment, a servo cylinder, generally designated 90, is provided and such servo cylinder 90 can be interpreted as a refinement of the servo cylinder 80 discussed above. FIG. 6 shows one of the pistons being divided into a piston portion, generally designated 91, which supports the second control surface 40 and a piston portion 93 which supports the first control surface 43. As is evident in FIG. 6, the remaining piston 81 is essentially unchanged. It is also clear from FIG. 6 that the piston portion 93 is disposed intermediate such piston portion 91 and the other piston 81. In this manner, the piston portion 93 will transmit the excess force produced on the piston portion 91 to such other piston 81. Such excess force is that force of the dynamic control pressure over the static control pressure. In order to transmit such excess force to the piston portion 93 and thence to piston 81, the piston portion 91 includes a shaft 92 which penetrates into the first control chamber 23 and abuttingly engages piston portion 93.

The volume of hydraulic fluid required to be supplied by the master cylinder 5 (FIG. 1) when the brake is activated by the vehicle operator and thus the stroke of the brake pedal 6 (FIG. 1) will usually be less with an intact dynamic control circuit. Conversely, when such dynamic control circuit fails, such volume of hydraulic fluid required will be larger and the stroke of the brake pedal 6 (FIG. 1) will be longer. This is the same as saying that when the dynamic control circuit is intact, the volume of the first control chamber 23 will be partially occupied by the shaft 92 of the piston portion 91. On the other hand, when the dynamic control circuit fails, the shaft 92 will be pushed by the static control pressure out of the first control chamber 23 to a stop when the piston portion 91 comes into contact with the housing of such servo cylinder 90.

The static control pressure in this embodiment of the invention acts on the first control surface 43 as well as on the end surface of the shaft 92 located in the first control chamber 23. Consequently, the brake pressure which can be achieved in the brake chamber 22 by the dynamic control pressure by means of the second control surface 40 is thereby reduced. Therefore, as an effective first control surface 43, when the dynamic control circuit is intact only, the excess of such first control surface 43 over the end surface of such piston portion 91 and shaft 92, which is disposed within the first control chamber 23, can be considered. When the dynamic control circuit fails, however, the entire first control surface 43 is available for action by the static control pressure.

The changes in the volume of hydraulic fluid supplied and the effective portion of the first control surface 43 when the dynamic control circuit fails, as described above, are triggered and used as an internal sudden transmission change. In contrast to the embodiments of the invention illustrated in FIGS. 3 and 4, this internal sudden transmission change is achieved in this embodiment of the invention without removing the partition between the first control chamber 23 and the brake chamber 22 and thus the wheel brake cylinder 18. By means of an appropriate design of the first control surface 43 and/or of the reaction surface 45, therefore, by means of the internal sudden transmission change, even a brake pressure higher than the static control pressure can be achieved.

An additional advantage of this particular embodiment of the invention is that it offers the feature of such internal sudden transmission change without requiring the use of a rather complex and relatively expensive cutoff apparatus 71 (FIG. 4).

In order to achieve the advantages indicated in the embodiment of the invention illustrated in FIG. 4 and in the embodiment of the invention illustrated in FIG. 6, each of the piston portions 91 and 93 and the piston 81, or both piston portions 91 and 93 together and the piston 81 can be disposed in separate portions of the servo cylinder 90 housing, as indicated by the reference numerals 94 and 95.

Generally, the explanations and descriptions given above for the individual embodiments can be applied to each of the other embodiments so long as nothing in such explanations and descriptions would be contradictory.

Although numerous embodiments of both the servo cylinder and the power brake for an anti-lock hydraulic brake system have been described in detail above, it should be obvious to those persons who are skilled in the vehicle braking art that various other modifications and adaptations can be made to the present invention without departing from the spirit and scope of the appended claims.

We claim:

1. A power brake apparatus for an anti-lock hydraulic brake system, said power brake apparatus comprising;
   (a) a master cylinder having a hydraulic fluid communication inlet port connected to an auxiliary reservoir and a hydraulic fluid communication outlet port which communicates a static control pressure that is a function of an application force being applied to said master cylinder;
   (b) a servo valve apparatus having a hydraulic fluid communication inlet port connectable to receive a supply pressure from a pressure source and a hydraulic fluid communication outlet port which communicates a dynamic control pressure, said dynamic control pressure up to a level of such supply pressure is in a fixed transmission ratio to said static control pressure, said servo valve apparatus being controllable by said static control pressure;
   (c) at least one servo cylinder, said servo cylinder including;
      (i) a housing member,
      (ii) a first control chamber formed in said housing member adjacent a first end thereof,
      (iii) a first fluid communication passageway formed through a wall of said housing member and in fluid communication with said first control chamber to enable connection of said first control chamber directly with said hydraulic fluid communication outlet port of said master cylinder of such power brake apparatus, said master cylinder communicating said static control pressure to said first control chamber during a brake application,
      (iv) a second control chamber formed in said housing member adjacent said first end thereof,
      (v) a second fluid communication passageway formed through a wall of said housing member and in fluid communication with said second control chamber to enable connection of said second control chamber with a fluid communication outlet port of an anti-lock valve apparatus of such hydraulic brake system having further a hydraulic fluid communication inlet port connected to receive said dynamic control pressure from said servo valve apparatus,
      (vi) an equalization chamber formed in said housing member,
      (vii) a third fluid communication passageway formed through a wall of said housing member and in fluid communication with said equalization chamber to enable connection of said equalization chamber with said hydraulic fluid communication outlet port of said servo valve apparatus of such power brake apparatus,
      (viii) a brake chamber formed in said housing member adjacent a second end thereof, said first end and said second end of said housing member being disposed axially opposite one another, (ix) a fourth fluid communication passageway formed through a wall of said housing member and in fluid communication with said brake chamber to enable connection of said brake chamber with a hydraulic fluid inlet port of at least one brake cylinder of such hydraulic brake system to enable communication of a brake pressure to such brake cylinder during such brake application, and (x) a piston unit positioned for reciprocal movement within a bore formed in said housing member, said piston unit including;

(1) a first control surface for delimiting said first control chamber, (2) a second control surface for delimiting said second control chamber, (3) a reaction surface for delimiting said brake chamber, and (4) an equalization surface for delimiting said equalization chamber, said equalization surface being disposed such that said dynamic control pressure in said equalization chamber exerts a force on said piston unit in the same direction as said brake pressure on said reaction surface of said piston unit, and (5) the ratio of the surface area of said equalization surface to the surface area of said first control surface being at least the reciprocal of said transmission ratio of said dynamic control pressure to said static control pressure.

2. A power brake apparatus, according to claim 1, wherein said surface area of said equalization surface is in a ratio to said surface area of said first control surface as a maximum expected static control pressure to a supply pressure delivered from a pressure supply source of such hydraulic brake system.

3. A power brake apparatus, according to claim 1, wherein said piston unit further includes an auxiliary valve which connects said brake chamber with a pressure supply source of such hydraulic brake system when such hydraulic brake system is inactive.

4. A power brake apparatus, according to claim 2, wherein said piston unit further includes an auxiliary valve which connects said brake chamber with such pressure supply source of such hydraulic brake system when such hydraulic brake system is inactive.

5. A power brake apparatus, according to claim 1, wherein said piston unit consists of at least two separate components.

6. A power brake apparatus, according to claim 2, wherein said piston unit consists of at least two separate components.

7. A power brake apparatus, according to claim 4, wherein said piston unit consists of at least two separate components.

8. A power brake apparatus, according to claim 1, wherein said servo cylinder further includes a cutoff apparatus which when such brake system is inactive connects said first control chamber and said brake chamber and when a dynamic circuit of such hydraulic brake system fails connects said first control chamber and said brake chamber.

9. A power brake apparatus, according to claim 2, wherein said servo cylinder further includes a cutoff apparatus which when such brake system is inactive connects said first control chamber and said brake chamber and when a dynamic circuit of such hydraulic brake system fails connects said first control chamber and said brake chamber.

10. A power brake apparatus, according to claim 5, wherein said servo cylinder further includes a cutoff apparatus which when such brake system is inactive connects said first control chamber and said brake chamber and when a dynamic circuit of such hydraulic brake system fails connects said first control chamber and said brake chamber.

11. A power brake apparatus, according to claim 8, wherein said cutoff apparatus is disposed in said piston unit.

12. A power brake apparatus, according to claim 8, wherein said cutoff apparatus is electrically controlled.

13. A power brake apparatus, according to claim 9, wherein said cutoff apparatus is electrically controlled.

14. A power brake apparatus, according to claim 10, wherein said cutoff apparatus is electrically controlled.

15. A power brake apparatus, according to claim 11, wherein said cutoff apparatus is electrically controlled.

16. A power brake apparatus, according to claim 5, wherein said two separate components of said piston unit are engaged with one another on their facing end surfaces, said first control surface and said second control surface are located on a first of said two separate components, and said equalization surface and said reaction surface are located on a second of said two separate components.

17. A power brake apparatus, according to claim 16, wherein each of said two separate components are disposed in separate housing portions.

18. A power brake apparatus, according to claim 6, wherein said two separate components of said piston unit are engaged with one another on their facing end surfaces, said first control surface and said second control surface are located on a first of said two separate components, and said equalization surface and said reaction surface are located on a second of said two separate components.

19. A power brake apparatus, according to claim 1, wherein said piston unit consists of a first piston portion supporting said second control surface, a second piston portion supporting said first control surface and a piston supporting both said reaction surface and said equalization surface, said second piston portion is located intermediate said first piston portion and said piston.

20. A power brake apparatus, according to claim 19, wherein said first piston portion includes a shaft which penetrates into said first control chamber and is engageable with said second piston portion.

21. A power brake apparatus, according to claim 2, wherein said piston unit consists of a first piston portion supporting said second control surface, a second piston portion supporting said first control surface and a piston supporting both said reaction surface and said equalization surface, said second piston portion is located intermediate said first piston portion and said piston.

22. A power brake apparatus, according to claim 21, wherein said first piston portion includes a shaft which penetrates into said first control chamber and is engageable with said second piston portion.

23. A power brake apparatus, according to claim 19, wherein said first piston portion and said second piston portion are disposed in one housing portion, and said piston is disposed in a separate housing portion.

24. A power brake apparatus, according to claim 20, wherein said first piston portion and said second piston portion are disposed in one housing portion, and said piston is disposed in a separate housing portion.

25. A power brake apparatus, according to claim 21, wherein said first piston portion and said second piston portion are disposed in one housing portion, and said piston is disposed in a separate housing portion.

26. A power brake apparatus, according to claim 22, wherein said first piston portion and said second piston portion are disposed in one housing portion, and said piston is disposed in a separate housing portion.

27. A power brake apparatus, according to claim 19, wherein each of said first piston portion and said second piston portion and said piston are disposed in separate housing portions.

28. A power brake apparatus, according to claim 20, wherein each of said first piston portion and said second piston portion and said piston are disposed in separate housing portions.

29. A power brake apparatus, according to claim 21, wherein each of said first piston portion and said second piston portion and said piston are disposed in separate housing portions.

30. A power brake apparatus, according to claim 22, wherein each of said first piston portion and said second piston portion and said piston are disposed in separate housing portions.

31. A power brake apparatus, according to claim 1, wherein said anti-lock system is an electrically activated valve means.

32. A power brake apparatus, according to claim 16, wherein said anti-lock system is an electrically activated valve means.

33. A power brake apparatus, according to claim 32, wherein said apparatus further includes a means connected to said master cylinder for activating said master cylinder during a brake application.

34. A power brake apparatus, according to claim 33, wherein said means for activating said master cylinder is a foot operated brake pedal.

35. A power brake apparatus, according to claim 33, wherein said pressure source includes a fluid compressor, a reservoir, and a pressure control apparatus.

36. A power brake apparatus, according to claim 35, wherein said pressure control apparatus is a governor.

37. A power brake apparatus, according to claim 35, which includes a plurality of said electrically activated valve means and a plurality of said servo cylinders.

38. A servo cylinder for use in conjunction with a power brake apparatus for an anti-lock hydraulic brake system, said servo cylinder comprising:
   (a) a housing member;
   (b) a first control chamber formed in said housing member;
   (c) a first fluid communication passageway formed through a wall of said housing member and in fluid communication with said first control chamber to enable connection of said first control chamber directly with a hydraulic fluid communication outlet port of a master cylinder of such hydraulic brake system, such master cylinder communicating a static control pressure to said first control chamber during a brake application;
   (d) a second control chamber formed in said housing member adjacent a first end thereof;
   (e) a second fluid communication passageway formed through a wall of said housing member and in fluid communication with said second control chamber to enable connection of said second control chamber with a hydraulic fluid communication outlet port of an anti-lock apparatus of such hydraulic brake system, said anti-lock apparatus communicating a dynamic control pressure to said second control chamber during such brake application;
   (f) an equalization chamber formed in said housing member intermediate said first control chamber and said second control chamber;
   (g) a third fluid communication passageway formed through a wall of said housing member and in fluid communication with said equalization chamber to enable connection of said equalization chamber with a hydraulic fluid communication outlet port of a servo valve apparatus of such hydraulic brake system;
   (h) a brake chamber formed in said housing member adjacent a second end thereof, said first end and said second end of said housing member being disposed axially opposite one another;
   (i) a fourth fluid communication passageway formed through a wall of said housing member and in fluid communication with said brake chamber to enable connection of said brake chamber with a hydraulic fluid inlet port of a brake cylinder of such hydraulic brake system to enable communication of a brake pressure to such brake cylinder during such brake application; and
   (j) a piston unit positioned for reciprocal movement within a bore formed in said housing member, said piston unit including;
      (i) a first control surface for delimiting said first control chamber,
      (ii) a second control surface for delimiting said second control chamber,
      (iii) a reaction surface for delimiting said brake chamber, and
      (iv) an equalization surface for delimiting said equalization chamber, said equalization surface being disposed substantially parallel to and intermediate said first control surface and said second control surface, a surface area of said equalization surface is in a ratio to a surface area of said first control surface at least as a reciprocal of a transmission ratio of said dynamic control pressure to said static control pressure.

39. A servo cylinder, according to claim 38, wherein said surface area of said equalization surface is in a ratio to said surface area of said first control surface as a maximum expected static control pressure to a supply pressure delivered from a pressure supply source of such hydraulic brake system.

40. A servo cylinder, according to claim 38, wherein said piston unit further includes an auxiliary valve which connects said brake chamber with a pressure supply source of such hydraulic brake system when such hydraulic brake system is inactive.

41. A servo cylinder, according to claim 39, wherein said piston unit further includes an auxiliary valve which connects said brake chamber with such pressure supply source of such hydraulic brake system when such hydraulic brake system is inactive.

42. A servo cylinder, according to claim 38, wherein said piston unit consists of at least two separate components.

43. A servo cylinder, according to claim 39, wherein said piston unit consists of at least two separate components.

44. A servo cylinder, according to claim 41, wherein said piston unit consists of at least two separate components.

45. A servo cylinder, according to claim 38, wherein said servo cylinder further includes a cutoff apparatus which when such brake system is inactive connects said first control chamber and said brake chamber and when a dynamic circuit of such hydraulic brake system fails connects said first control chamber and said brake chamber.

46. A servo cylinder, according to claim 39, wherein said servo cylinder further includes a cutoff apparatus which when such brake system is inactive connects said first control chamber and said brake chamber and when a dynamic circuit of such hydraulic brake system fails connects said first control chamber and said brake chamber.

47. A servo cylinder, according to claim 42, wherein said servo cylinder further includes a cutoff apparatus which when such brake system is inactive connects said first control chamber and said brake chamber and when a dynamic circuit of such hydraulic brake system fails connects said first control chamber and said brake chamber.

48. A servo cylinder, according to claim 45, wherein said cutoff apparatus is disposed in said piston unit.

49. A servo cylinder, according to claim 45, wherein said cutoff apparatus is electrically controlled.

50. A servo cylinder, according to claim 46, wherein said cutoff apparatus is electrically controlled.

51. A servo cylinder, according to claim 47, wherein said cutoff apparatus is electrically controlled.

52. A servo cylinder, according to claim 48, wherein said cutoff apparatus is electrically controlled.

53. A servo cylinder, according to claim 42, wherein said two separate components of said piston unit are engaged with one another on their facing end surfaces, said first control surface and said second control surface are located on a first of said two separate components, and said equalization surface and said reaction surface are located on a second of said two separate components.

54. A servo cylinder, according to claim 53, wherein each of said two separate components are disposed in separate housing portions.

55. A servo cylinder, according to claim 43, wherein said two separate components of said piston unit are engaged with one another on their facing end surfaces, said first control surface and said second control surface are located on a first of said two separate components, and said equalization surface and said reaction surface are located on a second of said two separate components.

56. A servo cylinder, according to claim 38, wherein said piston unit consists of a first piston portion supporting said second control surface, a second piston portion supporting said first control surface and a piston supporting both said reaction surface and said equalization surface, said second piston portion is located intermediate said first piston portion and said piston.

57. A servo cylinder, according to claim 56, wherein said first piston portion includes a shaft which penetrates into said first control chamber and is engageable with said second piston portion.

58. A servo cylinder, according to claim 39, wherein said piston unit consists of a first piston portion supporting said second control surface, a second piston portion supporting said first control surface and a piston supporting both said reaction surface and said equalization surface, said second piston portion is located intermediate said first piston portion and said piston.

59. A servo cylinder, according to claim 58, wherein said first piston portion includes a shaft which penetrates into said first control chamber and is engageable with said second piston portion.

60. A servo cylinder, according to claim 56, wherein said first piston portion and said second piston portion are disposed in one housing portion, and said piston is disposed in a separate housing portion.

61. A servo cylinder, according to claim 57, wherein said first piston portion and said second piston portion are disposed in one housing portion, and said piston is disposed in a separate housing portion.

62. A servo cylinder, according to claim 58, wherein said first piston portion and said second piston portion are disposed in one housing portion, and said piston is disposed in a separate housing portion.

63. A servo cylinder, according to claim 59, wherein said first piston portion and said second piston portion are disposed in one housing portion, and said piston is disposed in a separate housing portion.

64. A servo cylinder, according to claim 56, wherein each of said first piston portion and said second piston portion and said piston are disposed in separate housing portions.

65. A servo cylinder, according to claim 57, wherein each of said first piston portion and said second piston portion and said piston are disposed in separate housing portions.

66. A servo cylinder, according to claim 58, wherein each of said first piston portion and said second piston portion and said piston are disposed in separate housing portions.

67. A servo cylinder, according to claim 59, wherein each of said first piston portion and said second piston portion and said piston are disposed in separate housing portions.

68. A servo cylinder, according to claim 38, wherein said servo cylinder includes a spring portion in said brake chamber and caged between one end of said piston unit and said second end of said housing member for urging said piston unit away from said second end when such hydraulic brake system is inactive.

69. A servo apparatus, according to claim 8, wherein said cutoff apparatus is electrically operated.

70. A servo apparatus, according to claim 69, wherein said electrically operated cutoff apparatus receives a control signal from a pressure sensor which monitors said dynamic control pressure.

* * * * *